Patented Aug. 7, 1934

1,968,907

UNITED STATES PATENT OFFICE 1,968,907

COMPOSITION OF MATTER

David E. Pearsall, Pittsburgh, Pa., assignor to The Ensign-Bickford Co., Simsbury, Conn., a corporation of Connecticut No Drawing. Application August 5, 1931, Serial No. 555,389

6 Claims. (Cl. 134—15)

The present invention relates to compositions of matter adapted for waterproofing and other purposes. More particularly it relates to such compositions of matter which are light in color, tough, flexible and which will withstand climatic changes without being adversely affected thereby.

Various waxes and wax mixtures have been proposed as waterproofing agents, but as most natural and synthetic waxes have either a too low melting point or are too brittle at normal temperatures, they have not proven satisfactory for this purpose. The so-called petrolatum stock waxes fulfill quite well the characteristics for a composition of matter as set forth in the preceding paragraph, but the limits of their range of properties are narrow and they are also of too high cost for use as a general waterproofing substance. Accordingly, mixtures of petrolatum stock waxes with other less expensive ingredients have been proposed, but in all of such mixtures heretofore proposed with which I am familiar, the desirable properties of the petrolatum wax are absent. The reason for this will be apparent from a consideration of the fact that only a small percentage of paraffin may be added to petrolatum wax, for if added in amounts above 25%, the paraffin will be sweated out when the mixture is exposed to temperatures as high as 130° F. Also when inert fillers, such as whiting, clay, etc., are mixed with the petrolatum wax, its flexibility and toughness are entirely or substantially destroyed.

After considerable research in preparing and testing mixtures of petrolatum wax and other less costly substances I have found that the desirable properties of the petrolatum wax could be preserved and even improved upon by mixing therewith ester gum, polymerized turpentine and paraffin in certain proportions. I have also found that by varying the proportions of these ingredients within relatively wide limits the resulting compositions of matter possess certain desirable properties which admirably adapt them for specific uses. Examples of specific compositions and particular uses for which they are especially suited will be hereinafter set forth.

In commerce, the petrolatum waxes are known under the trade names as "Cerowax" and "Superlawax", and to the best of my knowledge are made from petrolatum stock obtained in the refining of petroleum. It is possible, however, that such waxes or similar products can be made from bases other than petroleum, and may be defined as ceraceous substances obtained from petroleum or other sources which are light in color, tough, flexible, of an amorphous or possibly a microcrystalline structure, which have a high melting point (160°–170° F.), and which retain their flexibility at low temperatures and their consistency without loss of volatile oils at temperatures as high as 130° F.

The so-called petrolatum stock waxes above referred to somewhat resemble wax-tailings but are of higher melting point, and further differ therefrom in that they are little affected by weather conditions, whereas wax-tailings, as well as ordinary paraffin, weather very poorly and become dry and powdery due to the loss of volatile oil constituents. Conceivably, the petrolatum waxes may be produced from wax-tailings. Asphaltum resins which may be produced from asphalt and which resemble wax-tailings, might also be considered as possible sources of material having properties analogous to those of the petrolatum waxes. Ceresine and ozokerite likewise possess certain of the advantageous properties of the petrolatum waxes to a marked degree.

I have found that the mixtures which I have prepared are particularly adapted for use as waterproofing coatings for blasting fuse, dynamite cartridges, and electrical conductors, and are also useful for electrical insulating purposes and for providing matrices for use in electrotyping and the like. They are also adapted for miscellaneous other uses since they are susceptible of being dyed or colored. The mixtures are prepared by merely melting or fusing together and agitating until uniform, the various ingredients in the proportions by weight indicated and they may be applied to their specific uses without the aid of solvents.

In its generic sense the invention may be said to relate to a composition of matter comprising 15% to 95% petrolatum wax and 5% to 85% ester gum. In a more specific sense it may be said to comprise 25% to 90% petrolatum wax, 5% to 75% ester gum and 5% to 50% paraffin.

Examples of compositions adapted for particular purposes are as follows:

As a waterproofing composition suitable for coating blasting fuse and the like:

| | Percent |
|---|---|
| Petrolatum wax | 45-90 |
| Ester gum | 5-45 |
| Paraffin | 5-20 |

A specific example within the foregoing limitations is a mixture having the following composition:

| | Percent |
|---|---|
| Petrolatum wax | 45 |
| Eser gum | 45 |
| Paraffin | 10 |

An example of a mixture adapted for insulating purposes is as follows:

| | Percent |
|---|---|
| Petrolatum wax | 70 |
| Ester gum | 30 |

As an example of a mixture particularly adapted for matrices for use in electrotyping or the like, the following composition has been found satisfactory:

| | Percent |
|---|---|
| Petrolatum wax | 80 |
| Ester gum | 15 |
| Paraffin | 5 |

In each of the foregoing examples, polymerized turpentine which is in a highly viscous or solid state may be used to replace a part or all of the ester gum without materially affecting the character of the resulting product or the use thereof; hence, wherever in the specification and claims reference is made to ester gum, it is to be understood that polymerized turpentine may be substituted therefor.

It is also to be understood that in the foregoing examples and in the claims which follow, the term petrolatum "wax" is used in a generic sense, and I intend said term to cover any natural or synthetic wax, wax combination or ceraceous material having a melting point sufficiently high to remain quite firm and not stain white paper when heated to a temperature as high as 130° F. and which will remain tough and flexible over a wide temperature range, for example, from 32°–130° F.

What I claim is:

1. A fused waterproofing composition of matter which is non-tacky and will not stain white paper at temperatures up to 130° F. comprising,

| | Percent |
|---|---|
| Petrolatum stock wax | 15-95 |
| Ester gum | 5-85 |

2. A fused waterproofing composition of matter which is non-tacky and will not stain white paper at temperatures up to 130° F. comprising,

| | Percent |
|---|---|
| Petrolatum wax | 25-90 |
| Ester gum | 5-75 |
| Paraffin | 5-50 |

3. A fused waterproofing composition of matter which is non-tacky and will not stain white paper at temperatures up to 130° F., comprising,

| | Percent |
|---|---|
| Petrolatum wax | 45-90 |
| Ester gum | 5-45 |
| Paraffin | 5-20 |

4. A fused waterproof composition, consisting of

| | Percent |
|---|---|
| Petrolatum wax | 45 |
| Ester gum | 45 |
| Paraffin | 10 |

5. A fused composition of matter, consisting of

| | Percent |
|---|---|
| Petrolatum wax | 70 |
| Ester gum | 30 |

6. A fused composition of matter, consisting of

| | Percent |
|---|---|
| Petrolatum wax | 80 |
| Ester gum | 15 |
| Paraffin | 5 |

DAVID E. PEARSALL.